(12) United States Patent
Gagner et al.

(10) Patent No.: US 8,672,752 B2
(45) Date of Patent: Mar. 18, 2014

(54) INTERFACE FOR WAGERING GAME ENVIRONMENTS

(75) Inventors: Mark B. Gagner, West Chicago, IL (US); Jacek A. Grabiec, Chicago, IL (US); Damon E. Gura, Chicago, IL (US); Michael J. Irby, II, Chicago, IL (US); Larry J. Pacey, Northbrook, IL (US); Scott H. Schulhof, Chicago, IL (US); Tracey L. Wright, West Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 172 days.

(21) Appl. No.: 12/741,745

(22) PCT Filed: Nov. 9, 2008

(86) PCT No.: PCT/US2008/082917
§ 371 (c)(1),
(2), (4) Date: May 6, 2010

(87) PCT Pub. No.: WO2009/062124
PCT Pub. Date: May 14, 2009

(65) Prior Publication Data
US 2010/0267449 A1    Oct. 21, 2010

Related U.S. Application Data

(60) Provisional application No. 60/986,602, filed on Nov. 9, 2007.

(51) Int. Cl.
*A63F 13/00*    (2006.01)

(52) U.S. Cl.
USPC .................. 463/29; 463/36; 463/37; 463/40; 463/41; 463/42; 715/830

(58) Field of Classification Search
USPC ............................................... 463/29, 36–37
See application file for complete search history.

(56) References Cited

U.S. PATENT DOCUMENTS 6,690,391 B1 * 2/2004 Proehl et al. .................. 715/720
6,712,698 B2    3/2004 Paulsen et al.
(Continued)

OTHER PUBLICATIONS

"PCT Application No. PCT/US08/82917 International Preliminary Report on Patentability", Mar. 11, 2010, 9 pages.
(Continued)

*Primary Examiner* — Ronald Laneau
*Assistant Examiner* — Justin Myhr
(74) *Attorney, Agent, or Firm* — DeLizio Gilliam, PLLC

(57) ABSTRACT

This document describes inter alia a method for presenting an interface on a wagering game machine, where the interface includes a plurality of wagering game icons, and where each of the wagering game icons indicates a wagering game that is available on the wagering game machine. The method can include presenting wagering game icons in an interface, wherein the wagering game icons form a row, and wherein each wagering game icon occupies a position in the row, and detecting a sweeping screen touch on a touch screen. The method can also include shifting, based on the sweeping screen touch, the wagering game icons to different positions in the row, where the shifting causes a wagering game icon at an end position in the row to disappear from the interface, and where the shifting also causes a new wagering game icon to appear at another end position in the row.

11 Claims, 13 Drawing Sheets

(56) References Cited

U.S. PATENT DOCUMENTS

| | | | |
|---|---|---|---|
| 7,474,348 B2 * | 1/2009 | Suzuki et al. | 348/333.05 |
| 2002/0033848 A1 * | 3/2002 | Sciammarella et al. | 345/838 |
| 2003/0169302 A1 * | 9/2003 | Davidsson et al. | 345/810 |
| 2004/0233238 A1 * | 11/2004 | Lahdesmaki | 345/810 |
| 2005/0215311 A1 * | 9/2005 | Hornik et al. | 463/20 |
| 2005/0235209 A1 * | 10/2005 | Morita et al. | 715/716 |
| 2006/0026535 A1 | 2/2006 | Hotelling et al. | |
| 2006/0136246 A1 * | 6/2006 | Tu | 705/1 |
| 2006/0247042 A1 * | 11/2006 | Walker et al. | 463/29 |
| 2007/0173310 A1 | 7/2007 | Walker et al. | |
| 2007/0197275 A1 * | 8/2007 | Gagner | 463/16 |
| 2007/0213132 A1 * | 9/2007 | Chilton et al. | 463/42 |
| 2007/0259717 A1 | 11/2007 | Mattice et al. | |
| 2008/0064499 A1 * | 3/2008 | Grant et al. | 463/36 |
| 2008/0113805 A1 * | 5/2008 | David et al. | 463/42 |

OTHER PUBLICATIONS

"PCT Application No. PCT/US08/82917 International Search Report", Mar. 26, 2009, 8 pages.

"Australian Application No. 2008323700 Examination Report", Jun. 18, 2012, 2 pages.

* cited by examiner

US 8,672,752 B2

INTERFACE FOR WAGERING GAME ENVIRONMENTS

RELATED APPLICATIONS

This application claims the priority benefit of U.S. Provisional Application Ser. No. 60/986,602 filed Nov. 9, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to interfaces for interacting with players in wagering game environments.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method for presenting an interface on a wagering game machine, the interface including a plurality of wagering game icons, wherein each of the wagering game icons indicates a wagering game that available on the wagering game machine, the method comprises presenting wagering game icons in an interface, wherein the wagering game icons form a row, and wherein each wagering game icon occupies a position in the row; detecting a sweeping screen touch on a touch screen; shifting, based on the sweeping screen touch, the wagering game icons to different positions in the row, wherein the shifting causes a wagering game icon at an end position in the row to disappear from the interface, wherein the shifting also causes a new wagering game icon to appear at another end position in the row; detecting a tap on the touch screen, wherein the tap coincides with one of the wagering game icons; and presenting, in response to the tap, information describing a wagering game associated with the one of the wagering game icons.

In some embodiments, the information includes an animation including game elements from the wagering game associated with the one of the wagering game icons.

In some embodiments, the method further comprises detecting a double tap on the touch screen; and presenting, in response to the double tap, the wagering game associated with the one of the wagering game.

In some embodiments, the sweeping screen touch coincides with a wheel in the interface.

In some embodiments, the method further comprises presenting, in the interface, a trail indicating where the sweeping screen touch occurred on the touch screen.

In some embodiments, the information includes real-time data indicating one or more of a recently awarded jackpot, an average jackpot amount in past hours, number of people currently playing the wagering game, and social contacts who have played the wagering game.

In some embodiments, the method further comprises detecting another tap on the touch screen; and presenting, in response to the other tap, a row of gaming option icons, wherein the gaming option icons shift based on sweeping screen touches, and wherein the gaming option icons are selectable via taps on the touch screen.

In some embodiments, a method for presenting an interface on a wagering game machine, the interface including a plurality of service icons associated with a plurality of services that are available via the wagering game machine, the method comprises presenting a row of service icons on a touch screen, wherein each service icon occupies an original position in the row, and wherein one of the service icons is larger than the other service icons; detecting a first input on the touch screen; moving, in response to the first touch screen input, some of the service icons from their original positions to other positions in the row, wherein the other positions are next to the original positions, and wherein the moving includes enlarging another of the service icons; detecting a second input on the touch screen, the second input coinciding with one of the service icons; and activating one of the plurality of services associated with the one of the service icons.

In some embodiments, the method further comprises procuring real-time data associated with the one of the plurality of services; presenting information about the one of the plurality of services, wherein the information is based on the real-time data.

In some embodiments, the method further comprises determining a number of options associated with the one of the plurality of services; procuring real-time data associated with the one of the plurality of services; reducing the number of options based on the real-time data; presenting service options icons in another row, wherein the service option icons can shift positions in the row in response to inputs on the touch screen.

In some embodiments, the plurality of services include one or more of a drink order service, a reservation service, and a concierge service.

In some embodiments, the row appears vertically on the touch screen.

In some embodiments, the first input is a sweep across the touch screen at a speed, and wherein the moving occurs at a rate based on the speed.

In some embodiments, the second input includes a tap on the touch screen.

In some embodiments, a method for presenting an interface on a wagering game machine, the interface including a plurality of wagering game icons associated with a plurality of wagering games that are available on the wagering game machine, the method comprises presenting the plurality of wagering game icons in the interface, wherein a first wagering game icon of the wagering game icons is larger than the other wagering game icons, and wherein a first group of the wagering game icons appears in a first queue left of the first wagering game icon, and wherein a second group of the wagering game icons appears in a second queue right of the first wagering game icon; detecting touch screen input requesting movement of the wagering game icons; moving the first wagering game icon to appear at a front position of the first queue, wherein the moving includes shrinking the first icon; moving one of the second group of wagering game icons to replace the first wagering game icon, wherein the moving includes enlarging the one of the second group of wagering game icons; detecting more touch screen input indicating a selection of the enlarged one of the second group of icons; and presenting a wagering game associated with the enlarged one of the second group of wagering game icons.

In some embodiments, the touch screen input requesting movement coincides with a graphical wheel in the interface.

In some embodiments, the wagering game icons are associated with wagering games of a common theme.

In some embodiments, only a portion of each wagering game icon of the first and second groups is visible.

In some embodiments, the method further comprises presenting information describing a wagering game associated with the enlarged one of the second group of wagering game icons.

In some embodiments, the information includes an animation including game elements from the wagering game associated with the enlarged one of the second group of wagering game icons.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into six sections. The first section provides an introduction to embodiments of the invention, while the second section describes example some example interfaces. The third section describes example network and machine architectures and the fourth section presents operations performed by some embodiments. The fifth section describes example wagering game machines in more detail. The sixth section presents some general comments.

Introduction

As wagering game technologies become more sophisticated, wagering game machines offer more wagering game options. For example, some wagering game machines allow players to choose from dozens of wagering game titles and play multiple games simultaneously. If players cannot easily find and play the wagering games they want, the multigame offerings have little value. Some embodiments of the invention provide an interface through which players can quickly and efficiently view and select wagering games and other options. For example, embodiments provide interfaces that present wagering game titles, images, and other interesting information about the wagering games. Some embodiments use the interfaces for presenting casino service options, such as reservation services, drink ordering services, concierge services, etc. These and other embodiments are described in more detail below.

Interfaces

This section presents interfaces included in some embodiments of the invention. Additionally, this section will describe various functionalities made available by the interfaces.

Figure 1:
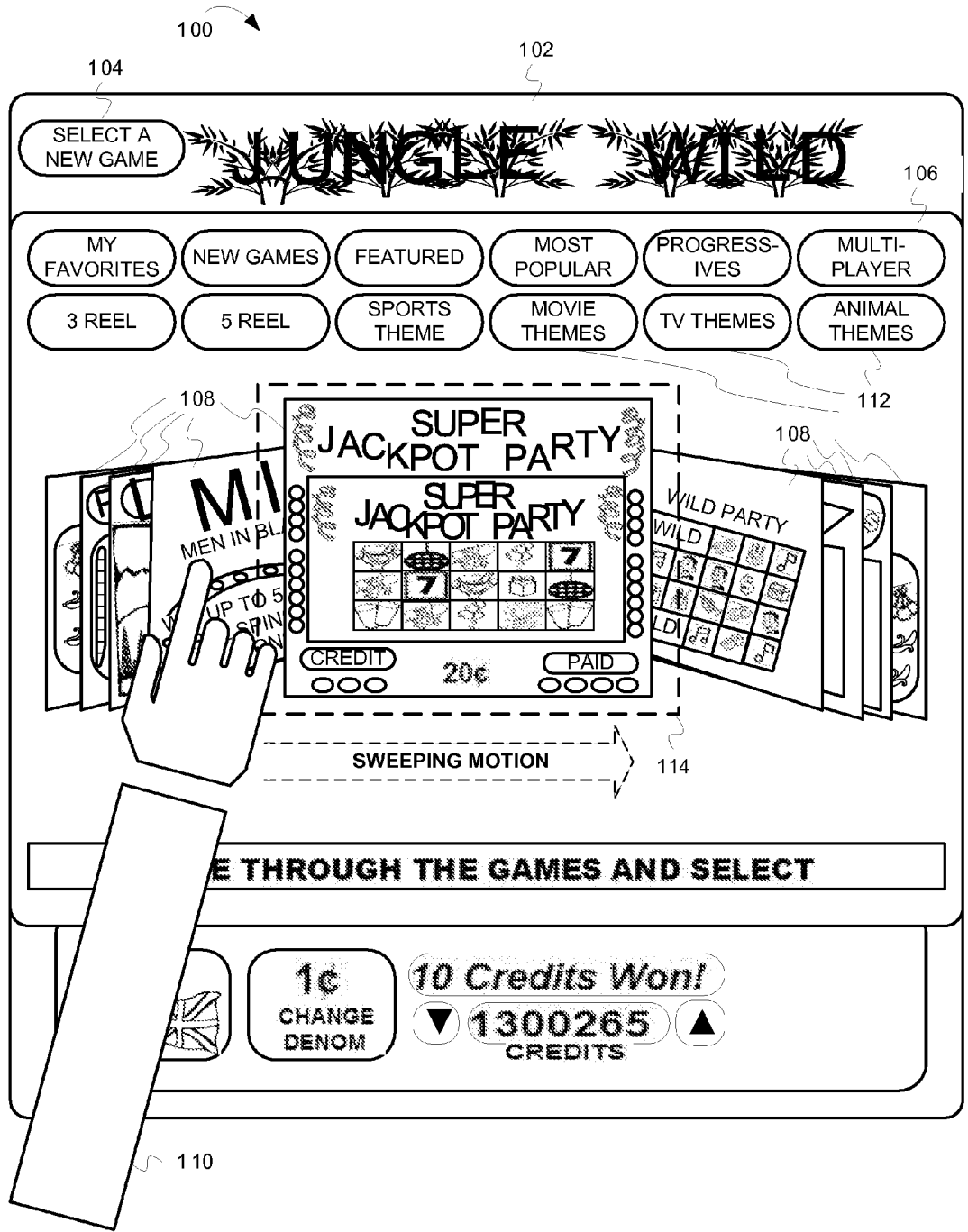
FIG. 1 is a block diagram illustrating an interface through which players can select wagering games, according to some embodiments of the invention.

FIG. 1 is a block diagram illustrating an interface through which players can select wagering games, according to some embodiments of the invention. According to some embodiments, a wagering game machine can offer many different wagering games. The wagering game machine can present an interface 100 to facilitate selection of available wagering games. The interface 100 can appear on a touch screen or other similar device.

The interface 100 includes a current game window 102, showing a current game title (e.g., "Jungle Wild"). The current game window 102 also includes a "select new game" button 104. If a player presses the "select new game" button 104, the wagering game machine presents the game selection window 106 (e.g., overlaying the current game window 102).

The game selection window 106 includes wagering game icons ("game icon") 108 that represent available wagering games. In the game selection window 106, one game icon 108 occupies a center position 114. The game icons 108 residing left and right of the center position 114 appear as if they are stacked, but with a portion of each game icon 108 remaining visible. Each game icon 108 can include a wagering game title, denomination, game image, and/or other information identifying a wagering game.

Figure 2:
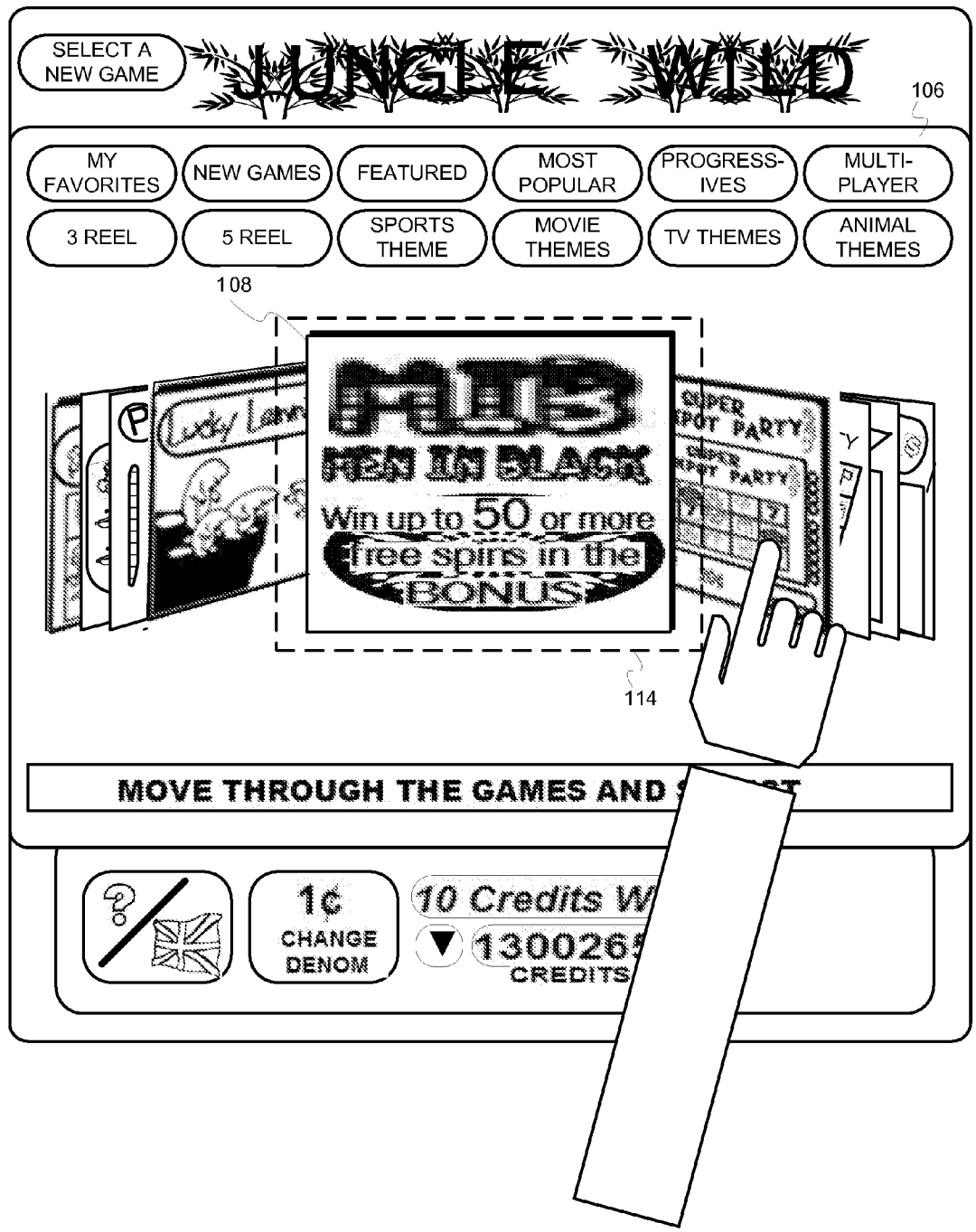
FIG. 2 shows the interface's game selection window 106 after the player 110 has moved the game icons.

A player 110 can move through the game icons 108 by touching the touch screen and using a left-to-right sweeping motion. As the player's finger moves across the touch screen, the game icons 108 shift. For example, the game icon 108 located just left of center moves to the center position 114, and the game icon 108 occupying the center position 114 moves right, and so on. With each move, a new game icon 108 appears on the far left, while the far right game icon 108 disappears. FIG. 2 shows the interface's game selection window 106 after the player 110 has moved the game icons 108. The player 110 can repeat the sweeping motion to expose more game icons. The player 110 can also move the game icons 108 right-to-left with a right-to-left sweeping motion. In some embodiments, the player 110 can launch a wagering game by tapping (or double tapping) the game icon 108 in the center position 114. After launching the wagering game, the wagering game machine can place graphics representing the game at any suitable screen location (e.g., in the center of the current game window 102, at the top of the current game window so other content is visible, etc.).

Referring back to FIG. 1, the game selection window 106 also includes theme buttons 112. The theme buttons 112 help to categorize available wagering games. Each theme button 112 is associated with wagering games of a particular theme (e.g., animal themes, TV themes, movie themes, or any other suitable theme). If the player 110 presses the "movie themes" button 112, the wagering game machine presents game icons for wagering games that have movie themes (e.g., Star Trek games, Dirty Harry games, etc.). Later, if the player presses the "TV themes" button 112, the game selection window 106 will replace the movie theme game icons with TV theme game icons. The player 110 can move through the game icons as described above.

Figure 3:
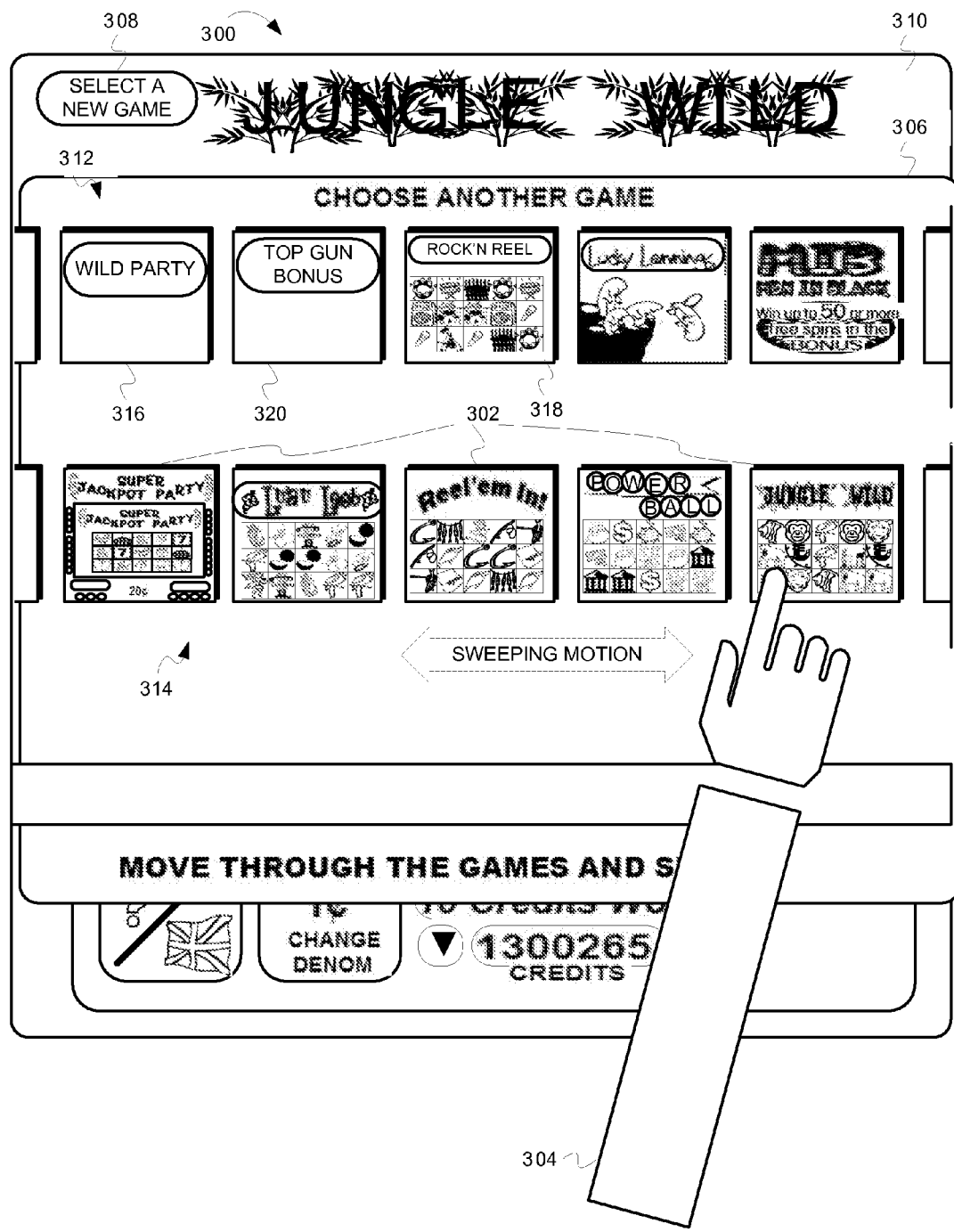
FIG. 3 is a block diagram illustrating an interface including two channels from which to choose wagering games, according to some embodiments of the invention.

FIG. 3 is a block diagram illustrating an interface including two channels from which to choose wagering games, according to some embodiments of the invention. In FIG. 3, a wagering game machine can present an interface 300 to facilitate selection of available wagering games. The interface 300 can appear on a touch screen or other similar device. The interface 300 includes a current game window 310, showing a current game title (e.g., "Jungle Wild"). The current game section 310 also includes a "select new game" button 308. If a player presses the "select new game" button 308, the wagering game machine presents the game selection window 306 (e.g., overlaying the current game window 310).

As shown in FIG. 3, the game selection window 306 shows two game channels 312 & 314 including game icons 302, 316, 318, & 320 associated with available wagering games. In each channel, the game icons 302 form a row. Although the channels 312 & 314 span the window 306 horizontally in FIG. 3, they can also appear vertically. A player 304 can move through the game icons 302 by dragging them across the screen. For each channel, the game icons 302 shift left-to-right or right-to-left, depending player input. As the game icons 302 shift, some game icons 302 move out of the game selection window 306, while new game icons 302 enter the window 306. For example, if the channel 312 shifts left, the game icon 316 will disappear from the interface 300 and the game icon 320 will move into the position formerly occupied by game icon 316. Additionally, the game icon 318 will move into the position formerly occupied by 320, and so on until all the game icons shift. At some point, game icons 302 may "wrap-around" and appear again in the window 306.

The player 304 can select a wagering game by tapping (or double tapping) on a game icon 302. After the player 304 selects a wagering game, the wagering game machine may hide the game selection window 306 and initiate the selected wagering game. Alternatively, the wagering game machine can allow the player 304 to select more games, so the player 304 can play a plurality of games at the same time. The game selection window 306 can also include theme buttons, as described above.

Figure 4:
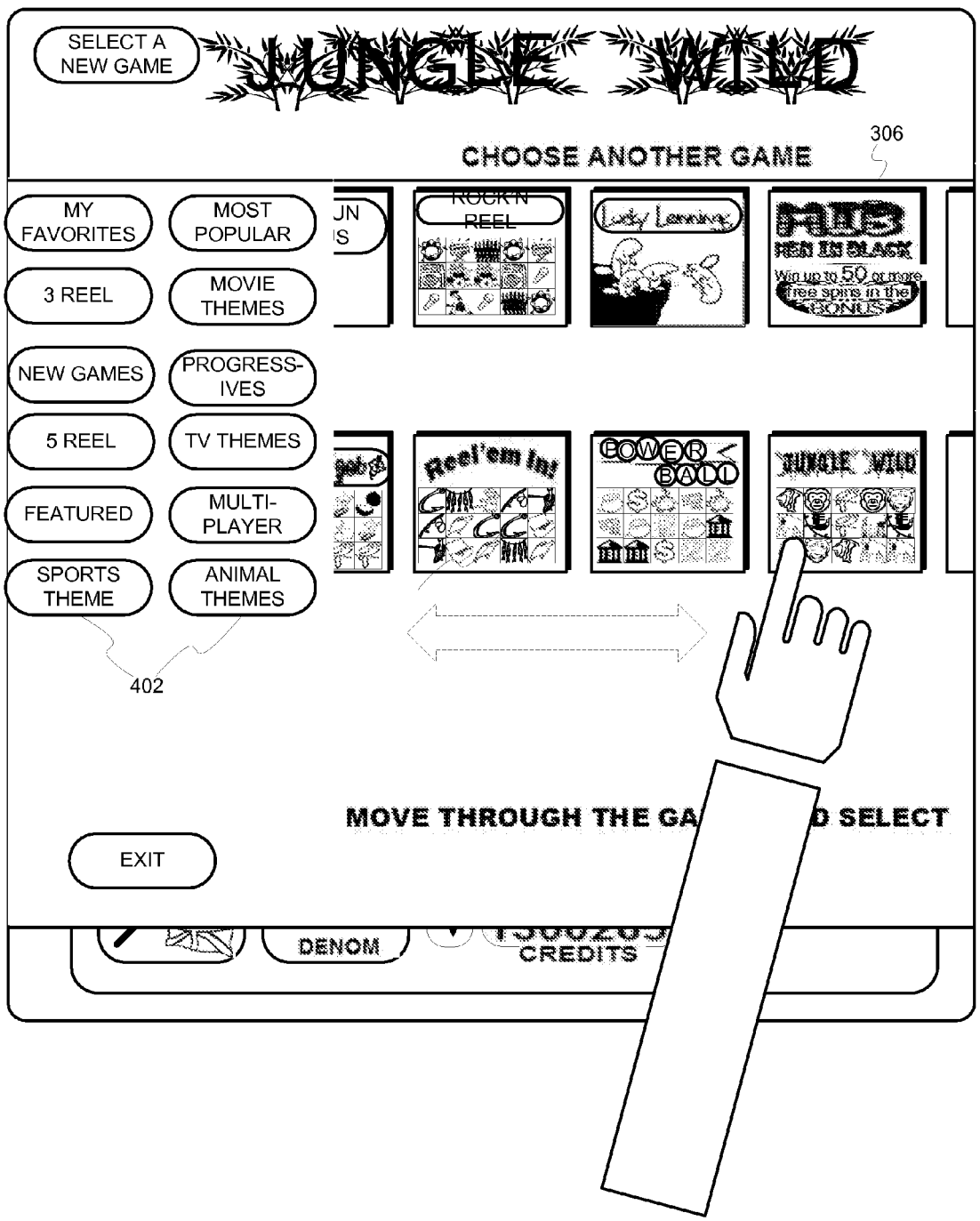
FIG. 4 is a block diagram illustrating an interface including theme buttons and two channels, according to some embodiments of the invention.

FIG. 4 is a block diagram illustrating an interface including theme buttons and two channels, according to some embodiments of the invention. In FIG. 4, the game selection window 306 includes theme buttons 402. The theme buttons 402 serve the same purpose as those described above. In some embodiments, if the player 304 selects a theme button 402, the wagering game machine adds another channel to the game selection window 306. However, there may be a limit the number of channels. If the window 306 includes multiple channels, a player can reposition channels by dragging them to desired locations. The theme buttons 402 and other items can appear as channels that include theme icons instead of game icons.

Some embodiments can include other features for enabling players to select wagering games and other options.

Figure 5:
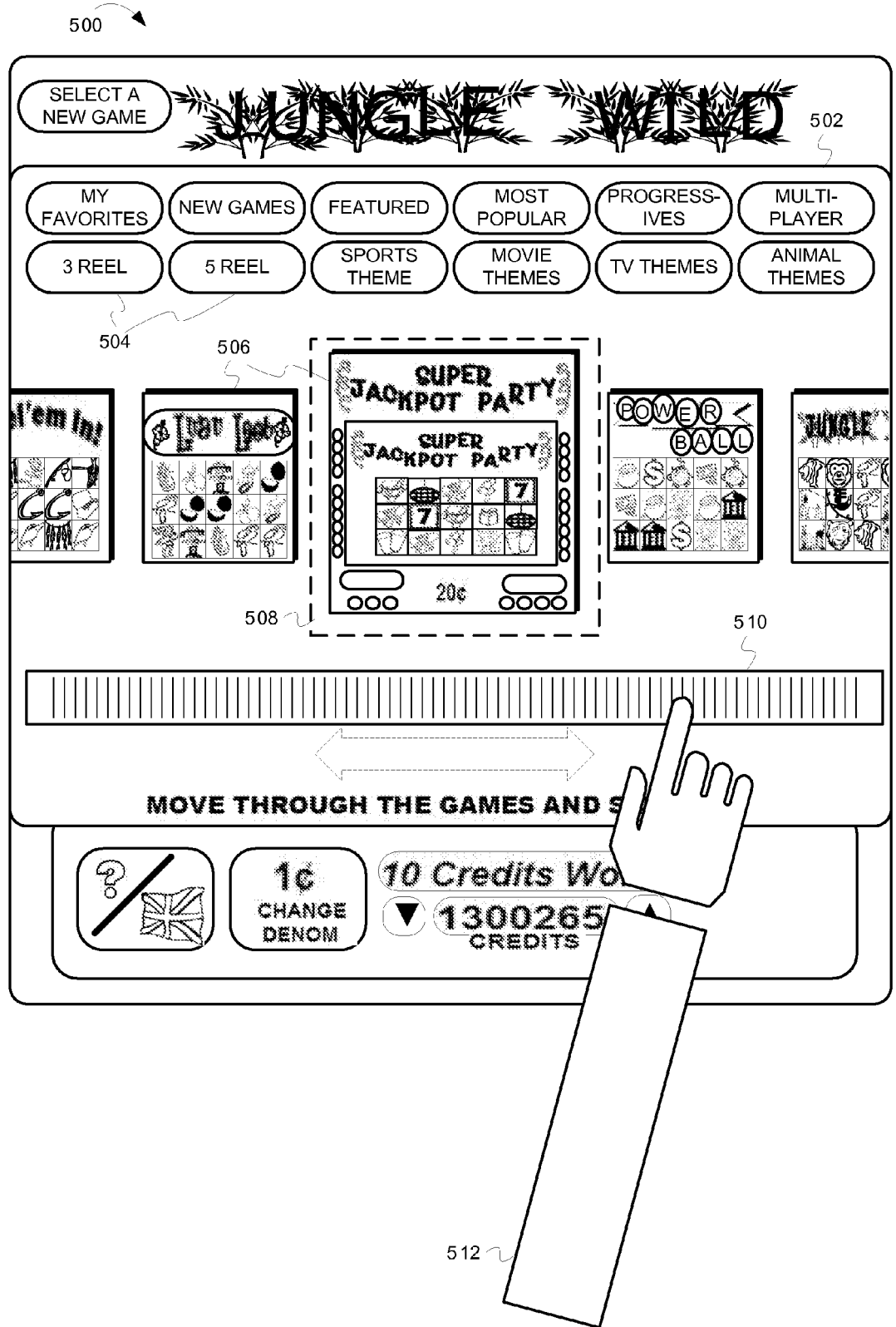
FIG. 5 is a block diagram illustrating an interface including a wheel for moving through game icons, according to some embodiments of the invention.

FIG. 5 is a block diagram illustrating an interface including a wheel for moving through game icons, according to some embodiments of the invention. In FIG. 5, a touch screen presents an interface 500. The interface 500 includes a game selection window 502 including theme buttons 504, game icons 506, and a wheel 510. The theme buttons 504 and game icons 506 are similar to those described above.

A player 512 can move through the game icons 506 by touching the touch screen and sweeping across the wheel 510. For example, as the player 512 sweeps across the wheel 510 left-to-right, the game icons 506 move left-to-right. As shown, the game icons 506 appear larger when they occupy the center position 508. The wagering game machine can employ a physics engine to render movements of the wheel 510 and game icons 506 in a manner that simulates a physical environment. The physics engine can simulate physical properties, such as gravity, tension, friction, etc. In some embodiments, each time the player's finger sweeps across the wheel 510, the next game icon 506 "snaps" into the center position 508, simulating a mechanical wheel (e.g., a thumb wheel) that snaps into preset positions. Alternatively, the wheel 510 can spin based on the speed of the player's sweeping motion. Players can slow the wheel 510 by sweeping the touch screen in the opposite direction or by tapping the touch screen to select a wagering game.

Figure 6:
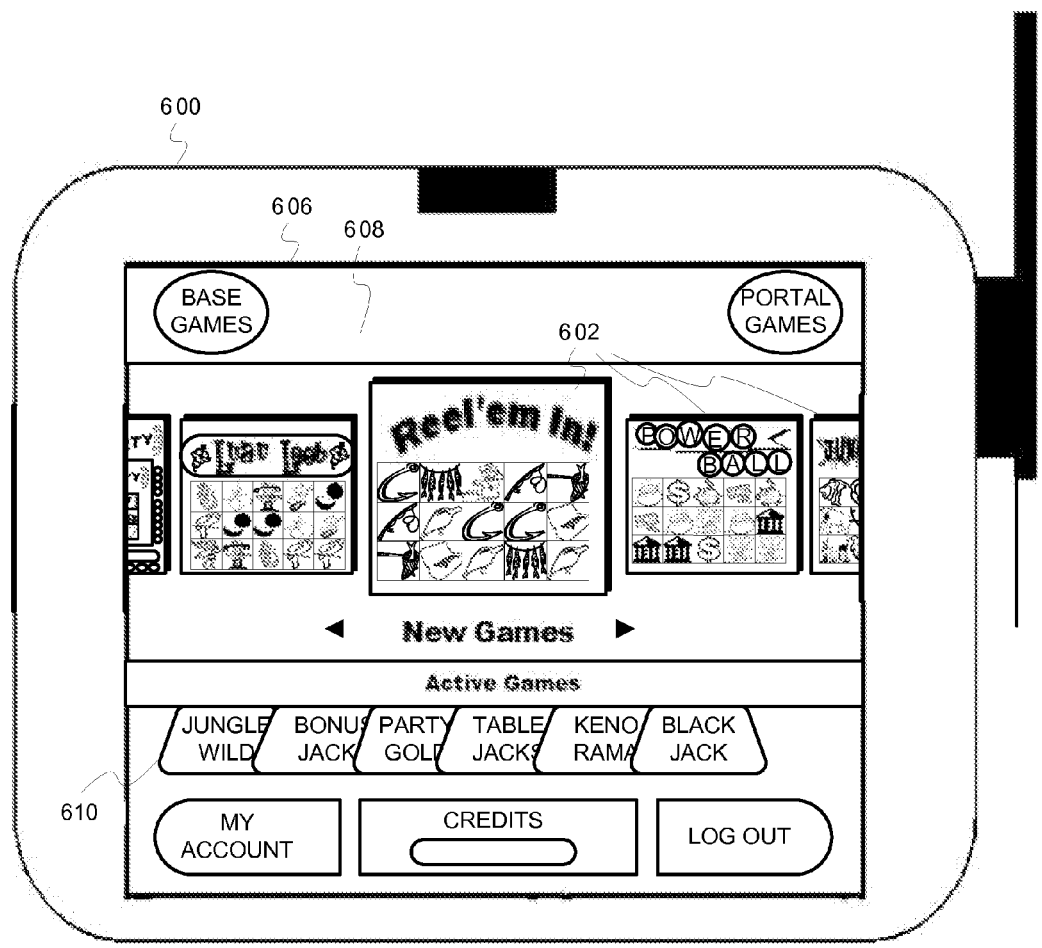
FIG. 6 is a block diagram illustrating a mobile wagering game machine including an interface through which players can select and play a plurality of wagering games.

Some wagering game machines are suited for mobility. Sometimes mobile wagering game machines ("mobile machines") have smaller touch screens than their stationary counterparts. FIG. 6 shows an embodiment in which a mobile machine presents an interface similar to those described above.

FIG. 6 is a block diagram illustrating a mobile wagering game machine including an interface through which players can select and play a plurality of wagering games. The mobile machine 600 includes a touch screen 606 on which it presents a game selection window 608. The game selection window 608 includes game icons 602 representing wagering games available for play on the mobile machine 600. Players can move through the game icons 602 by sweeping across the touch screen 606, as described above. Players can select wagering games for play by tapping the touch screen at locations coinciding with the game icons 602.

The mobile machine 600 allows players to switch between and play a plurality of games. To switch between games, players can press the different tabs 610. Each tab 610 is associated with a wagering game. In some embodiments, after a detecting a tab press, the wagering game machine displays graphics for a wagering game associated with the tab. Players can resume selecting games by pressing buttons (not shown) that bring about the game selection window 608.

Figure 7:
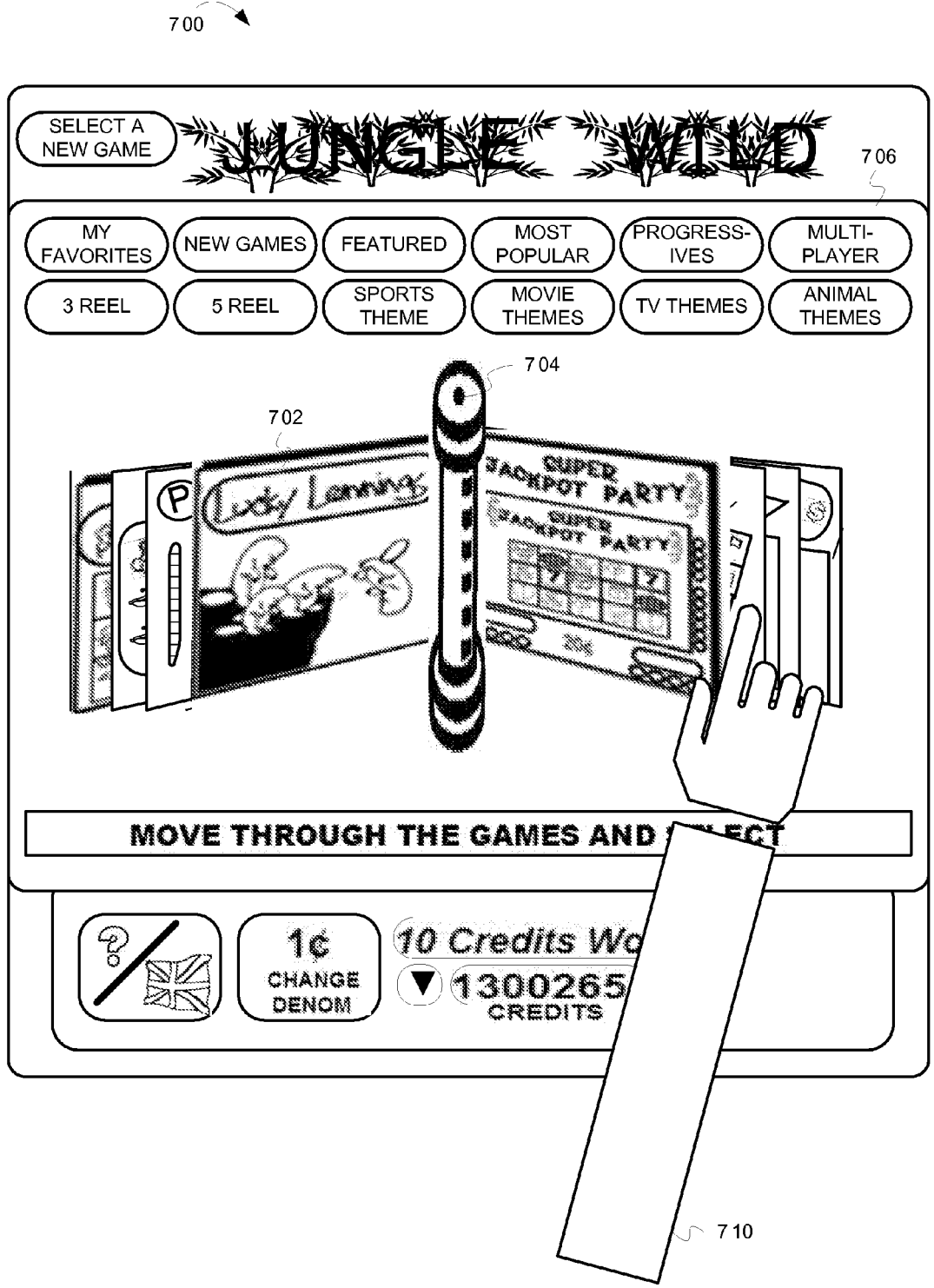
FIG. 7 is a block diagram illustrating an interface in which game icons appear on a carousel, according to some embodiments of the invention.

FIG. 7 is a block diagram illustrating an interface in which game icons appear on a carousel, according to some embodiments of the invention. The interface 700 includes a game selection window 706 including game icons 702 appearing as if they rotate about a carousel 704, much like cards in a Rolodex™. As a player 710 sweeps across the game icons 702, the wagering game machine repositions the game icons 702 as if the game icons 702 rotated around the carousel 704.

Additional Features

While FIGS. 1-7 show some embodiments of the invention, the following list describes additional features and embodiments.

Additional Information—When a game icon occupies the center position (e.g., see FIG. 1's 114), the wagering game machine can present additional information about the game below the game icon. The information can include the game's denominations, payout history (e.g., recent large payouts), payout percentage, upcoming tournaments for the selected game, etc. In some embodiments, the game icon flips over and the information appears as if it were on the icon's backside.

Animations—After a game icon moves to the center position (e.g., see FIG. 1's 114), in the space occupied by the game icon, the wagering game machine can present animations promoting the game. The animations can include game elements or characters from the associated wagering game. They can also include a replay of large jackpots or related bonus games.

Configuration Options—After detecting a wagering game selection, the wagering game machine can allow players to configure game options. The machine can present configurable game options as icons in a stack or channel, similar to those shown in FIGS. 1 & 3.

Casino Service Options—Wagering game machines can use the interfaces of FIGS. 1-6 for presenting casino service options such as reservation services (e.g., tee times, restaurant times, etc.), drink ordering services (e.g., a drink menu), concierge services, etc.

Player-Created Channels—Wagering game machines can create channels based on player history (e.g., most frequently played games) and they can allow players to create their own channels. Players create new channels by dragging the icons to specific locations in the interface. The game icons and other similar icons can have "handles" that enable players to facilitate easy drag and drop operations.

Channel Memory—Wagering game machines can remember a player's last channel selection and present it in future gaming sessions. In some embodiments, the wagering game machines store players' channel information in player accounts.

Divided Interface—Wagering game machines can present an interface divided into sections (e.g., quadrants). Some of the sections may present wagering games, while one section presents a game selection window. As a result, players can simultaneously play wagering games and select new wagering games.

Side Bets—Wagering game machines can present betting options using bet icons similar to the game icons noted above. Betting options can include bets for base games, side bets on bonus and base games, etc.

Multiple Screen Touches—Wagering game machines can include touch screens that can process multiple simultaneous screen touches (e.g., touching with both hands). To support this feature, the interface can allow users to simultaneously active multiple channels, game icons, and other interface elements.

Swipe Trail—As a player swipes a touch screen, the wagering game machines can present graphics that indicate where the swipe occurred. For example, the wagering game machine can present a translucent trail behind a finger swipe, where the trail fades over time. The gaming machine can store information about swipes in the player's account.

Operating Environment

This section describes an example operating environment and presents structural aspects of some embodiments. This section includes discussion about wagering game machines and wagering game networks that can be used in conjunction with embodiments of the invention.

Wagering Game Machines

Figure 8:
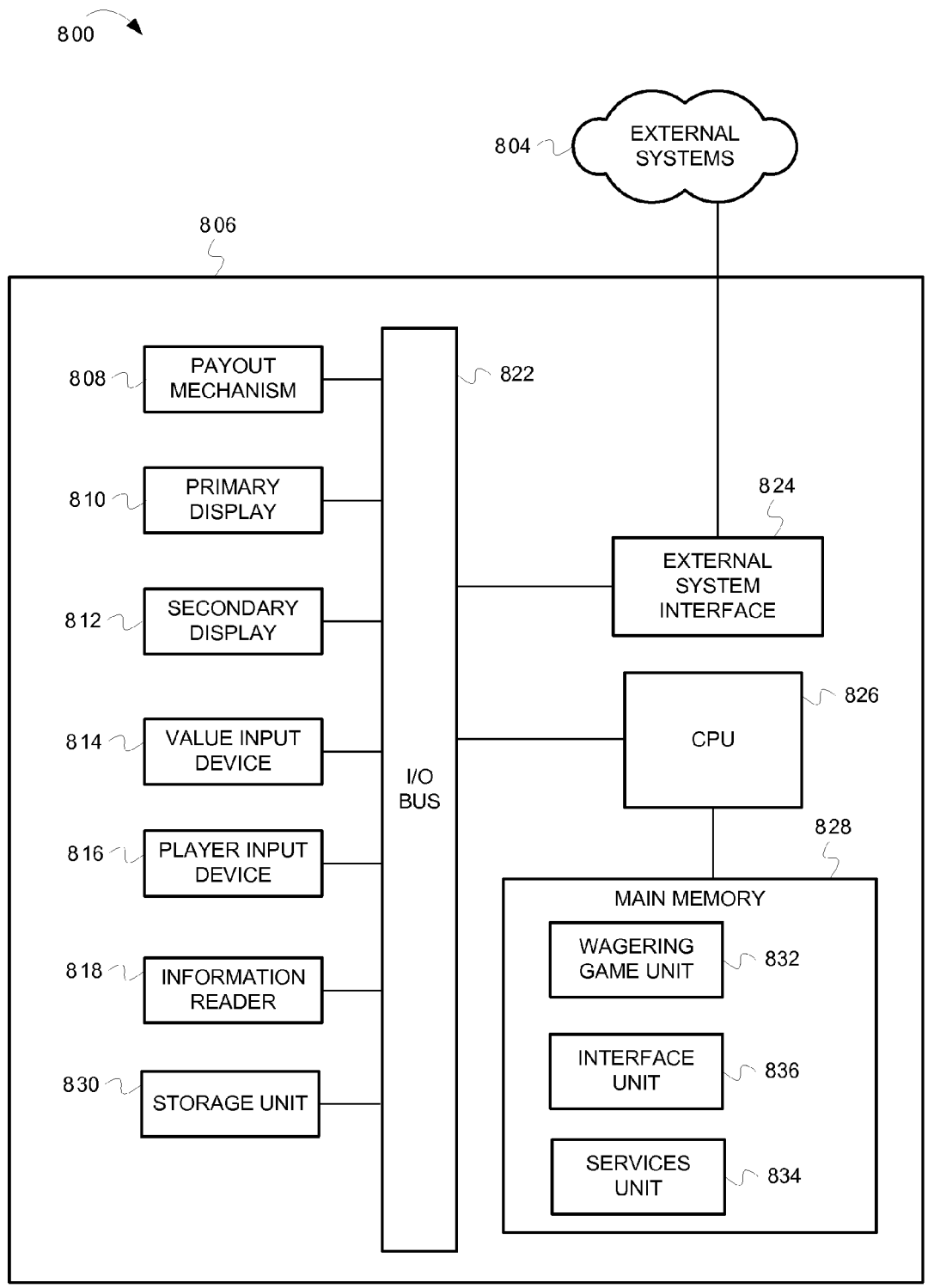
FIG. 8 is a block diagram illustrating a wagering game machine architecture, according to example embodiments of the invention.

FIG. 8 is a block diagram illustrating a wagering game machine architecture, according to example embodiments of the invention. As shown in FIG. 8, a wagering game machine 806 includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC® processor.

The main memory 828 includes a wagering game unit 832, interface unit 836, and services unit 832. The wagering game unit 832 can present wagering games, such as video poker, video black jack, video slots, video lottery, etc., in whole or part. Additionally, the wagering game unit 832 can present available wagering game options with help from the interface unit 836. The interface unit 836, operating in concert with the wagering game unit 832, can present interfaces through which players can select wagering games and other gaming options. The interface unit 836 can also assist the services unit 832 in presenting service options. The units 832, 834, & 836 can interact with components external to the wagering game machine. The components can include wagering game servers, services servers, account servers, etc. In some embodiments, the interface unit 836 is part of an operating system (not shown) that provides services to components of the wagering game machine 806.

The CPU 826 is also connected to an input/output (I/O) bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example wagering game machine architecture, this section continues with a discussion wagering game networks.

Wagering Game Networks

Figure 9:
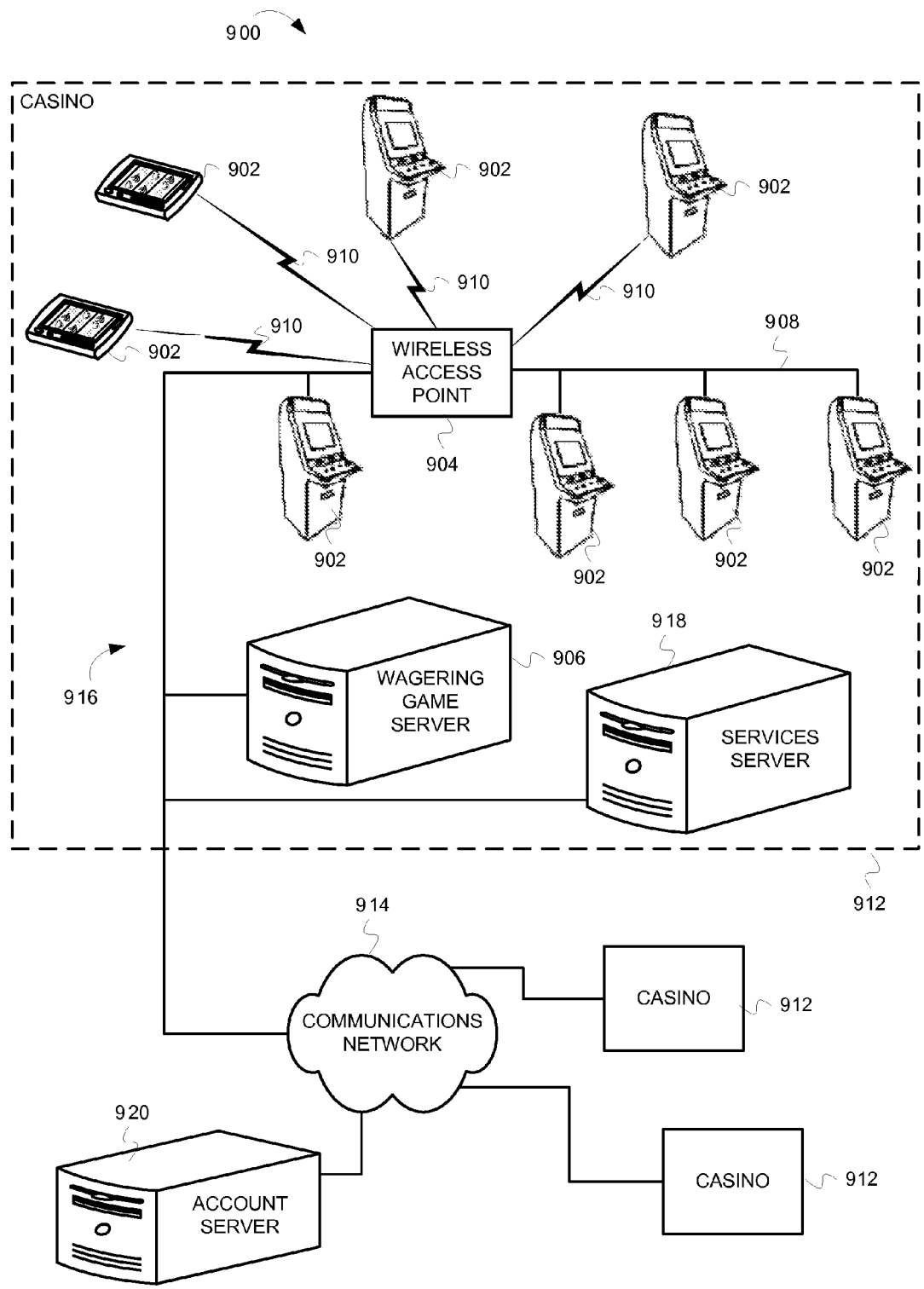
FIG. 9 is a block diagram illustrating a wagering game network, according to example embodiments of the invention.

FIG. 9 is a block diagram illustrating a wagering game network, according to example embodiments of the invention. As shown in FIG. 9, the wagering game network 900 includes a plurality of casinos 912 connected to a communications network 914.

Each casino 912 includes a local area network 916, which includes an access point 904, a wagering game server 906, and wagering game machines 902. The access point 904 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can host wagering games and/or distribute content to devices located in other casinos 912 or at other locations on the communications network 914. Hosting wagering games can include determining wagering game results and notifying wagering game machines of the results.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, the wagering game machines 902 can present wagering game options, configuration options, service options, etc. using one or more of the interfaces and features described herein.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

The wagering game network also includes a services server 918 and account server 920. The services server 918 can provide services (e.g., make reservations, take drink orders, purchase show tickets, etc.) via the wagering game machines 902. The account server 920 stores player account information, such as player choices, games played, player preferences, social contacts, financial information (e.g., balance, debits, credits, etc.). Other components of the wagering game network 900 can use the player account information to determine wagering game options, service options, etc.

Any of the wagering game network components (e.g., the wagering game machines 902) can include hardware and machine-readable media including instructions for performing the operations described herein.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 10:
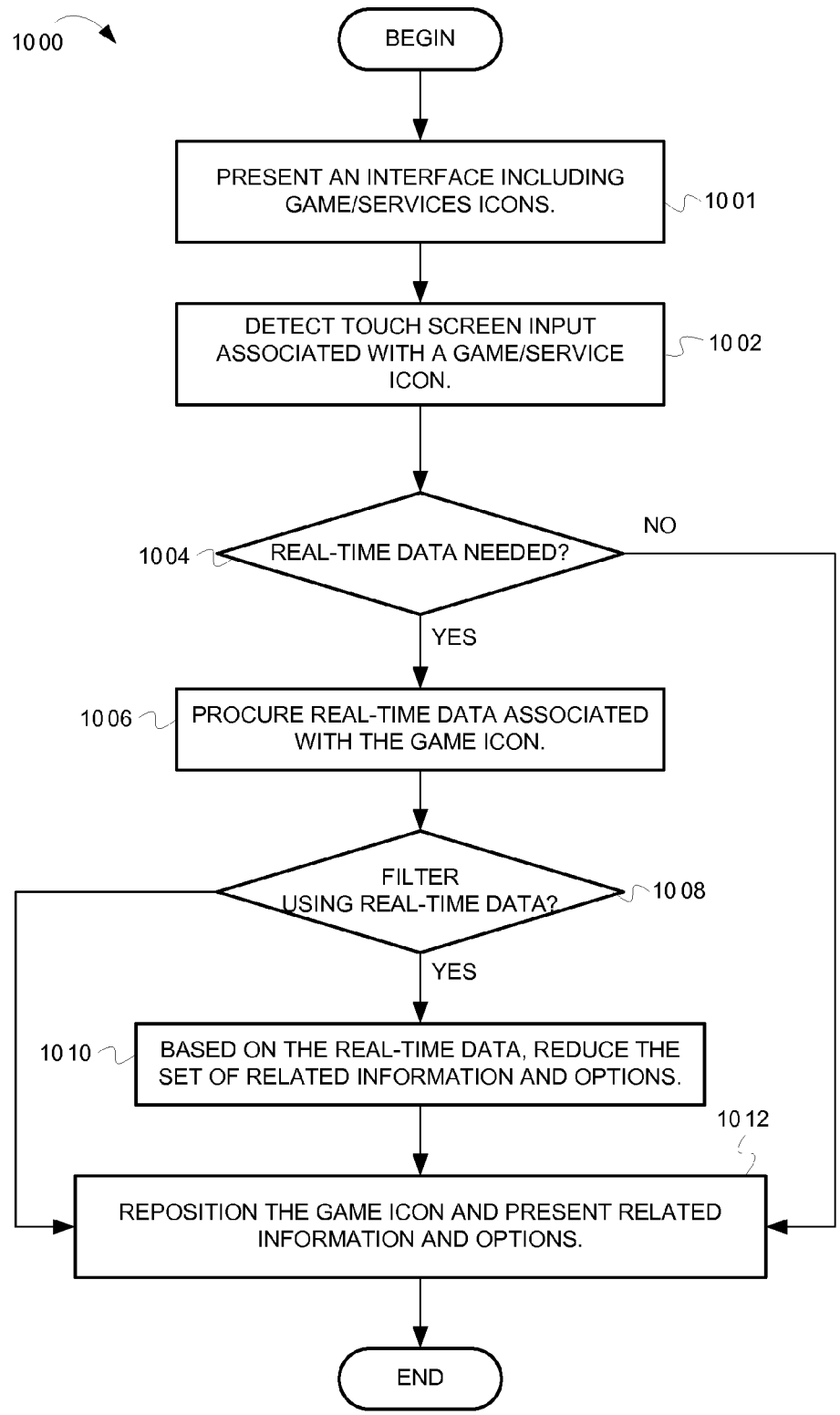
FIG. 10 is a flow diagram illustrating operations for modifying an interface based on player input and dynamic data, according to some embodiments of the invention.

FIG. 10 is a flow diagram illustrating operations for modifying an interface based on player input and dynamic data, according to some embodiments of the invention. The flow 1000 will be described with reference to the interfaces noted above and the wagering game network components shown in FIGS. 8-9. The flow 1000 begins at block 1001.

At block 1001, a wagering game machine's interface unit 836 presents an interface including game icons and/or service icons. For example, referring to FIG. 1, the interface unit 836 can present a selection window similar to the game selection window 106. In some embodiments, instead of the game icons 108, the window can include service icons associated with casino services, such as reservation services, drink ordering services, search services, etc. The flow continues at block 1002.

At block 1002, the interface unit 836 detects player input associated with a game icon or service icon. The player input can include screen touches, such as taps, sweeping motions, etc. The interface unit 836 can report the player input to the wagering game unit 832 (or services unit 834). The flow continues at block 1004.

At block 1004, the wagering game unit 832 (or services unit 834) determines whether dynamic data (e.g., real-time data) is needed for processing the player input. Game icons and/or service icons in the interface may be configured to display dynamic information when they are activated. The dynamic data can include information about recently awarded jackpots, the player's financial balance, the player's social contacts, bonus games, the player's game history, etc. The dynamic data can also include information about services, such as availability, weather, delays, etc. If dynamic data is needed, the flow continues at block 1006. Otherwise, the flow continues at block 1014.

At block 1006, the wagering game unit 832 (or services unit 834) procures real-time data associated with the game icon (or service icon) for which player input was received. The wagering game unit 832 (or services unit 834) can receive the real-time data from the services server 818, account server 820, wagering game server 806, or other components of the wagering game network 800. The flow continues at block 1008.

At block 1008, the wagering game unit 832 (or services unit 834) determines whether to filter information and options based on the dynamic data. For example, the wagering game unit 832 can use the dynamic data to tailor game configuration or service options. If the wagering game unit 832 will use the dynamic data to filter, flow continues at block 1010. Otherwise, the flow continues at block 1012.

At block 1010, based on the real-time data, the wagering game unit 832 (or services unit 834) reduces options and/or information related to the game/service icon for which player input was received. For example, if a player's financial balance is $50, the wagering game unit 832 eliminates denominations over $50 from possible configuration options. As another example, if the dynamic data indicates that a beverage service has run out of a particular drink, the services unit 834 eliminates the drink from the drink options. As yet another example, if the dynamic data indicates that a show sold out, the services unit 834 can remove the sold-out show from the available shows. Because the dynamic data can include any information about wagering games and services, the units 834 & 832 can use the dynamic data to narrow a wide variety of wagering game and service options. Also, because the components can narrow available options, the interface will include fewer icons for the player read. As a result, the interface becomes more efficient. The flow continues at block 1012.

At block 1012, the interface unit 836 repositions the game icon (or service icon) and presents related information and options. The interface unit 836 can also flip, rotate, or otherwise reposition icons. For example, the interface unit 836 can reposition a game or service icon by moving it to a center position (as shown in FIG. 1), where it appears more prominently. Additionally, the interface unit 836 presents information and options related to the icon. The interface unit 836 can present the information as part of the game/service icon or in another part of the interface. For example, the interface unit 836 can present, as part of the icon, a list of a player's social contacts who have played the wagering game associated with the icon. As another example, if a service icon is associated with a show, the interface unit 836 can present information about the show, such as the show time, plot, actors, etc. The interface unit 836 can present options as a separate channel in the same window or it can overlay the game/service icons with icons representing the options. From block 1012, the flow ends.

Figure 11A:
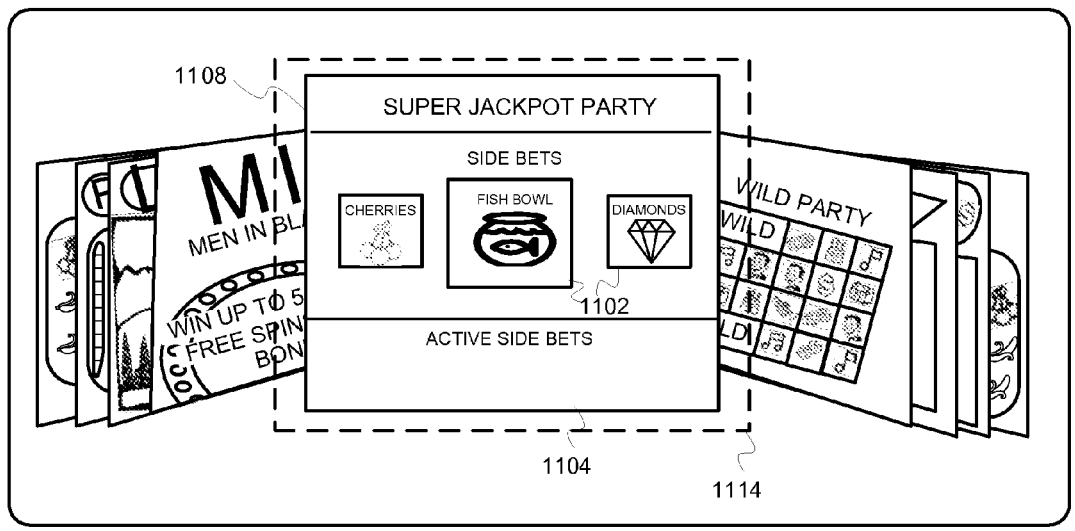
FIGS. 11A-11C illustrate some specific examples of how interface units can present dynamic information.
Figure 11B:
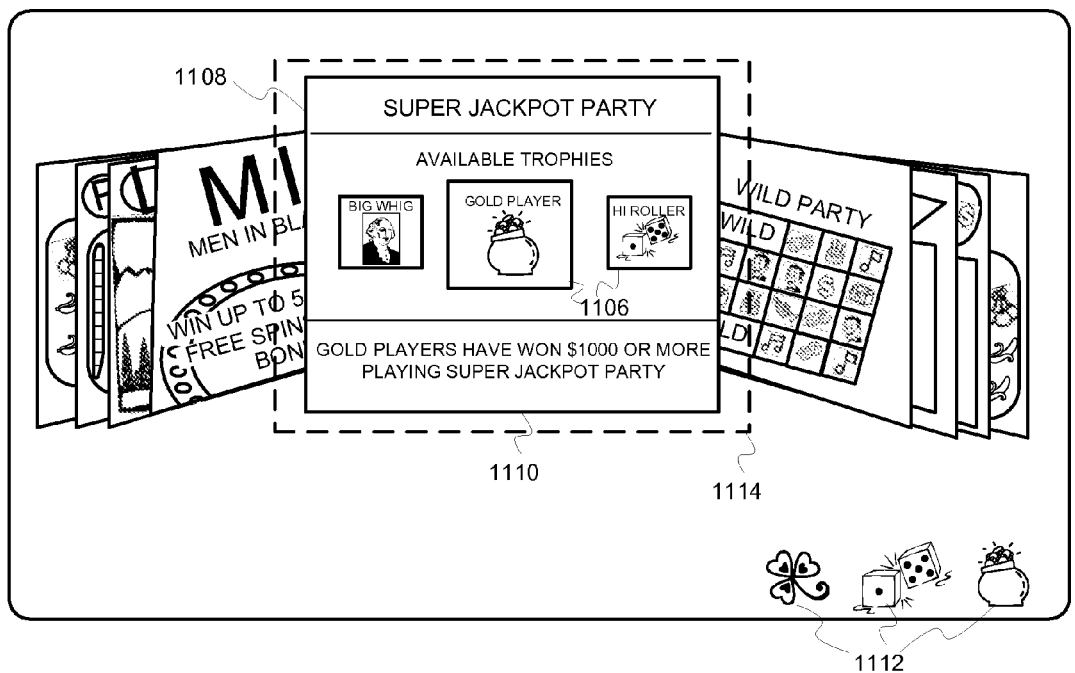
Figure 11C:
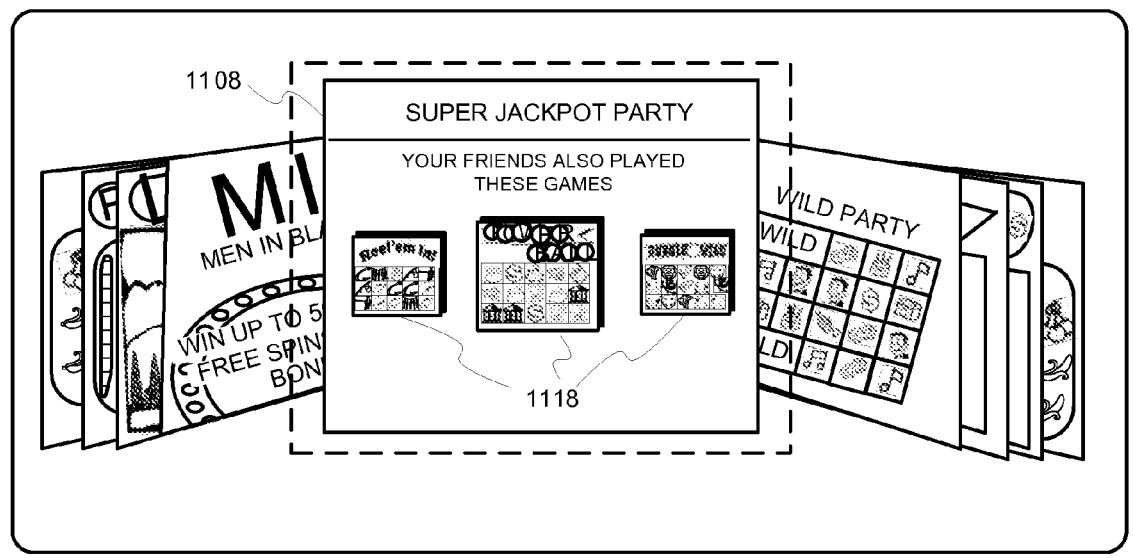

FIGS. 11A-11C illustrate some specific examples of how interface units can present related information. FIG. 11A shows a variation of the game icons from FIG. 1. In FIG. 11A, the interface unit reconfigured the game icon 1108 occupying the center position 1114 to show available side betting options. The available side betting options may change over time or in response to certain events. In revealing the side betting information, the interface unit may present a graphical sequence in which game icon 1108 "flips-over" to reveal the side betting information on its "back side." The available side bet games are associated with the side bet icons 1102. Players can move through the side bet icons 1106 using any of the above-described techniques. In some embodiments, if a player activates a side bet icon, the interface unit shows the side bet icon in the active side bets window 1104.

FIG. 11B shows another example of presenting dynamic information. In FIG. 11B, the interface unit has flipped the game icon 1108 to reveal trophies available for playing Super Jackpot Party. Trophy information can be dynamic, as the trophies available for a given game may change over time. For example, when a game is released, there may be only one available trophy. As time passes, more trophies may become available, some may cease to be available, etc. Players can move through the trophy icons 1106 using any of the above-described techniques. When a trophy icon 1106 occupies the center position (or another prominent position), the interface unit can present a description of the trophy in the description window 1110. In some embodiments, the wagering game machine also determines and displays a player's trophies in the player interface (see player trophy icons 1112).

FIG. 11C shows yet another example of presenting dynamic information. In FIG. 11C, the interface unit has flipped the game icon 1108 to reveal games played by a player's social contacts. For example, the dynamic information can include a listing of games played by a player's social contacts who also played Super Jackpot Party (or other games). In some instances, this information can include games that were highly rated by other players (i.e., not limited to social contacts), games specifically recommended by social contacts, etc.

Example Wagering Game Machines

Figure 12:
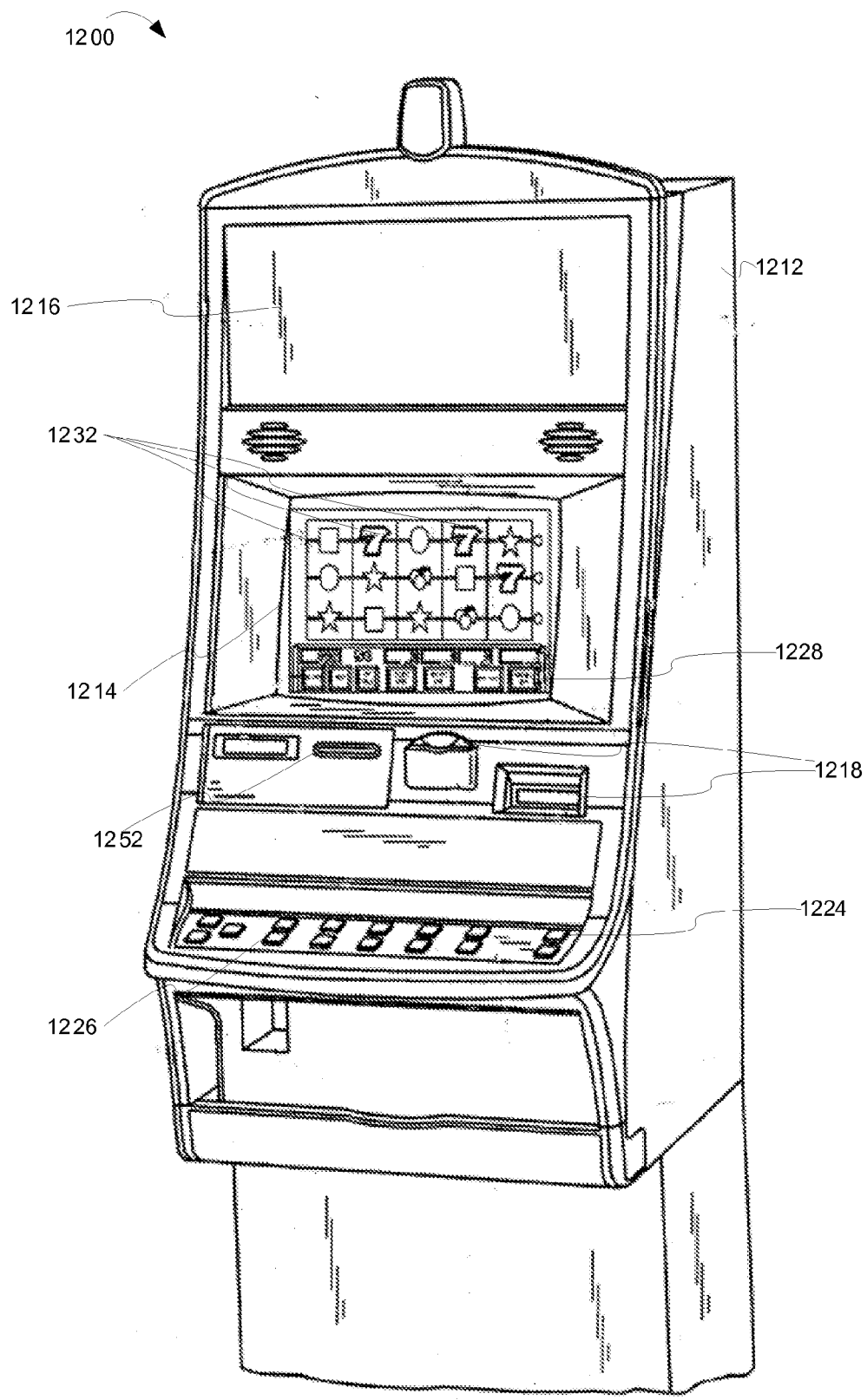
FIG. 12 is a perspective view of a wagering game machine, according to example embodiments of the invention.

FIG. 12 is a perspective view of a wagering game machine, according to example embodiments of the invention. Referring to FIG. 12, a wagering game machine 1200 is used in gaming establishments, such as casinos. According to embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1228 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bartop model, mobile handheld model, or workstation console model.

A player begins playing a basic wagering game by making a wager via the value input device 1218. The player can initiate play by using the player input device's buttons or touch screen 1228. The basic game can include arranging a plurality of symbols along a payline 1232, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface. In some embodiments, the information reader 1252 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for offering wagering games for selection and presentation on a wagering game machine, the method comprising:
    presenting, by a processor, wagering game icons in an interface of the wagering game machine, wherein the wagering game icons form a row, and wherein each wagering game icon occupies a position in the row;
    detecting a sweeping screen touch on a touch screen, wherein the interface appears on the touch screen;
    shifting, based on the sweeping screen touch, the wagering game icons to different positions in the row, wherein the shifting causes a wagering game icon at an end position in the row to disappear from the interface, wherein the shifting also causes a previously presented wagering game icon to appear at another end position in the row;
    detecting a single tap on the touch screen, wherein the single tap coincides with one of the wagering game icons, wherein the one of the wagering game icons is associated with a wagering game, wherein the single tap causes presentation of configuration options for the wagering game, wherein the configuration options include a denomination selection, and wherein the single tap causes presentation of dynamic information associated with the wagering game and a player;
    determining a credit balance for the wagering game machine;
    determining that the credit balance for the wagering game machine is below one or more denominations for the wagering game;
    presenting the configuration options for the wagering game including the denomination selection, wherein the denomination selection includes denominations for the wagering game that are below the credit balance for the wagering game machine;
    determining the dynamic information associated with the wagering game and a player, wherein the dynamic information indicates social contacts associated with the player that have recently played the wagering game;
    presenting the dynamic information in the interface;
    detecting a double tap on the touch screen, wherein the double tap causes presentation of the wagering game; and
    presenting the wagering game.

2. The method of claim 1, wherein the information includes real-time data related to one or more of the player's social contacts currently playing the wagering game, the player's social contacts' ratings of the wagering game, recent jackpots won on the wagering game, a duration since a last jackpot was won on the wagering game, and information about the wagering game.

3. The method of claim 1, wherein the presenting the dynamic information includes presenting only the dynamic information available at the time of presentation.

4. The method of claim 1, further comprising:
    determining, from among the dynamic information, current options available for the player; and
    presenting, in the interface, the current options available for the player.

5. The method of claim 1, further comprising:
    determining side betting options available for the wagering game;

presenting, in the interface, the side betting options available for the wagering game; and
receiving user input selecting one or more of the side betting options.

6. The method of claim 1, further comprising:
determining trophies available for the wagering game; and
presenting, in the interface, the available trophies.

7. A method for presenting an interface on a wagering game machine, the interface including a plurality of wagering game icons associated with a plurality of wagering games that are available on the wagering game machine, the method comprising:
presenting, by one or more processors, the plurality of wagering game icons in the interface on the wagering game machine, wherein a first wagering game icon of the wagering game icons is larger than the other wagering game icons, and wherein a first group of the wagering game icons appears in a first queue left of the first wagering game icon, and wherein a second group of the wagering game icons appears in a second queue right of the first wagering game icon;
detecting touch screen input requesting movement of the wagering game icons;
moving, in the interface on the wagering game machine, the first wagering game icon to appear at a front position of the first queue, wherein the moving includes shrinking the first icon;
moving, in the interface on the wagering game machine, one of the second group of wagering game icons to replace the first wagering game icon, wherein the moving includes enlarging the one of the second group of wagering game icons;
detecting a second touch screen input, wherein the second touch screen input coincides with the enlarged on of the second group of wagering game icons, wherein the second touch screen input causes presentation of configuration options for the wagering game, wherein the configuration options include a denomination selection, and wherein the second touch screen input causes presentation of dynamic information associated with the wagering game and a player;

determining a credit balance for the wagering game machine;
determining that the credit balance for the wagering game machine is below one or more denominations for the wagering game;
presenting the configuration options for the wagering game including the denomination selection, wherein the denomination selection includes denominations for the wagering game that are below the credit balance for the wagering game machine;
determining the dynamic information associated with the wagering game and a player, wherein the dynamic information indicates social contacts associated with the player that have recently played the wagering game;
detecting more touch screen input indicating a selection of the enlarged one of the second group of icons;
presenting, in the interface on the wagering game machine, a wagering game associated with the enlarged one of the second group of wagering game icons.

8. The method of claim 7, further comprising:
presenting, in response to the second touch screen input, the dynamic information.

9. The method of claim 7, further comprising:
determining real-time data associated with the wagering game, wherein the real-time data includes one or more of trophies available for the wagering game, players currently playing the wagering game, recent jackpots awarded for the wagering game, tournaments available for the wagering game; and
presenting, in the interface, the real-time data.

10. The method of claim 7 further comprising:
determining side bets available for the wagering game;
presenting, in the interface, the side bets; and
receiving user input selecting one of the side bets.

11. The method of claim 10 further comprising:
determining trophies available for the wagering game;
presenting, in the interface, the trophies available for the wagering game; and
receiving user input, wherein the user input scrolls though the trophies available for the wagering game.

* * * * *

UNITED STATES PATENT AND TRADEMARK OFFICE
CERTIFICATE OF CORRECTION

PATENT NO.        : 8,672,752 B2                                          Page 1 of 1
APPLICATION NO.   : 12/741745
DATED             : March 18, 2014
INVENTOR(S)       : Gagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 211 days.

Signed and Sealed this

Twenty-ninth Day of September, 2015

Michelle K. Lee
*Director of the United States Patent and Trademark Office*